US010286891B2

(12) United States Patent
Joyce et al.

(10) Patent No.: US 10,286,891 B2
(45) Date of Patent: May 14, 2019

(54) VEHICLE PARKING SYSTEM FAILURE MANAGEMENT

(71) Applicant: Ford Global Technologies, LLC, Dearborn, MI (US)

(72) Inventors: John P. Joyce, West Bloomfield, MI (US); Scott J. Lauffer, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 473 days.

(21) Appl. No.: 14/663,933

(22) Filed: Mar. 20, 2015

(65) Prior Publication Data

US 2016/0009257 A1 Jan. 14, 2016

Related U.S. Application Data

(60) Provisional application No. 62/023,435, filed on Jul. 11, 2014.

(51) Int. Cl.
*B60T 17/22* (2006.01)
*B60T 8/171* (2006.01)
*B60T 8/88* (2006.01)
*B60T 7/12* (2006.01)

(52) U.S. Cl.
CPC .............. *B60T 17/221* (2013.01); *B60T 7/12* (2013.01); *B60T 8/171* (2013.01); *B60T 8/885* (2013.01); *B60T 2270/402* (2013.01)

(58) Field of Classification Search
CPC .......... B60T 17/221; B60T 7/12; B60T 8/885; B60T 8/171; B60T 2270/40202; B60T 2270/40–2270/416
See application file for complete search history.

(56) References Cited

U.S. PATENT DOCUMENTS

| 6,256,570 B1* | 7/2001 | Weiberle | B60T 7/042 188/170 |
| 2004/0140710 A1* | 7/2004 | Alvarez | B60T 7/042 303/20 |
| 2006/0232124 A1* | 10/2006 | Friederich | B60T 7/12 303/3 |

(Continued)

FOREIGN PATENT DOCUMENTS

| DE | 102012217704 | 6/2014 |
| EP | 2719593 A1 | 4/2014 |
| KR | 20130037751 | 4/2013 |

OTHER PUBLICATIONS

GB Search Report for Application No. GB1511675.9 dated Jan. 25, 2016.

*Primary Examiner* — Genna M Mott
(74) *Attorney, Agent, or Firm* — Frank A. MacKenzie; Bejin Bieneman PLC

(57) ABSTRACT

A system includes an autonomous sub-system that includes first and second braking modules. Each of the modules includes a processor and a memory, the memory storing instructions executable by the processor for detecting a fault. The system further includes a brake sub-system programmed to actuate a brake mechanism in response to a signal from the second braking module. The autonomous sub-system is further programmed to select one of the braking modules to provide a signal to the brake mechanism depending on whether a fault is detected.

14 Claims, 5 Drawing Sheets

(56) References Cited

U.S. PATENT DOCUMENTS

| | | |
|---|---|---|
| 2008/0232015 A1* | 9/2008 | Wakabayashi .......... B60T 8/321 |
| | | 361/79 |
| 2010/0090522 A1 | 4/2010 | Bensch et al. |
| 2015/0203082 A1* | 7/2015 | Forster .................... B60T 7/08 |
| | | 701/70 |
| 2016/0214595 A1* | 7/2016 | Baehrle-Miller ......... B60T 7/22 |

* cited by examiner

VEHICLE PARKING SYSTEM FAILURE MANAGEMENT

CROSS-REFERENCE TO RELATED APPLICATIONS

This application claims priority to U.S. Provisional Patent Application No. 62/023,435, titled "VEHICLE PARKING SYSTEM FAILURE MANAGEMENT" and filed on Jul. 11, 2014, the contents of which are hereby incorporated by reference in its entirety.

BACKGROUND

A vehicle such as an automobile depends upon reliable and failsafe delivery of power to various vehicle components. For example, a failure to deliver power or communications to one or more vehicle parking restraint mechanisms, e.g., a parking brake, engagement of gears in a vehicle powertrain, etc., could put a vehicle driver, other vehicle occupants, and/or people outside the vehicle at risk. Reliable parking mechanisms are particularly important in the case of an autonomous vehicle, i.e., a vehicle in which some or all operations conventionally controlled by a human driver are controlled and carried out by components in the vehicle without driver intervention.

DETAILED DESCRIPTION

Unfortunately, present mechanisms are lacking for detecting and/or addressing a power and/or communications failures with respect to vehicle parking restraint mechanisms. An example system that can address such power and/or communication failures includes an autonomous sub-system that includes first and second braking modules, each of the modules comprising a processor and a memory, the memory storing instructions executable by the processor for detecting a fault. The system further includes a parking sub-system programmed to actuate a parking restraint mechanism in a vehicle powertrain in response to a signal from the first braking module, a brake sub-system programmed to actuate a brake mechanism in response to a signal from the second braking module, a first power source that powers the parking sub-system and the vehicle powertrain, and a second power source that powers the brake sub-system. The autonomous sub-system is further programmed for one of the braking modules to provide a signal to actuate one of the parking restraint mechanism and the brake mechanism depending on whether a fault is detected.

The elements shown may take many different forms and include multiple and/or alternate components and facilities. The example components illustrated are not intended to be limiting. Indeed, additional or alternative components and/or implementations may be used.

Figure 1:
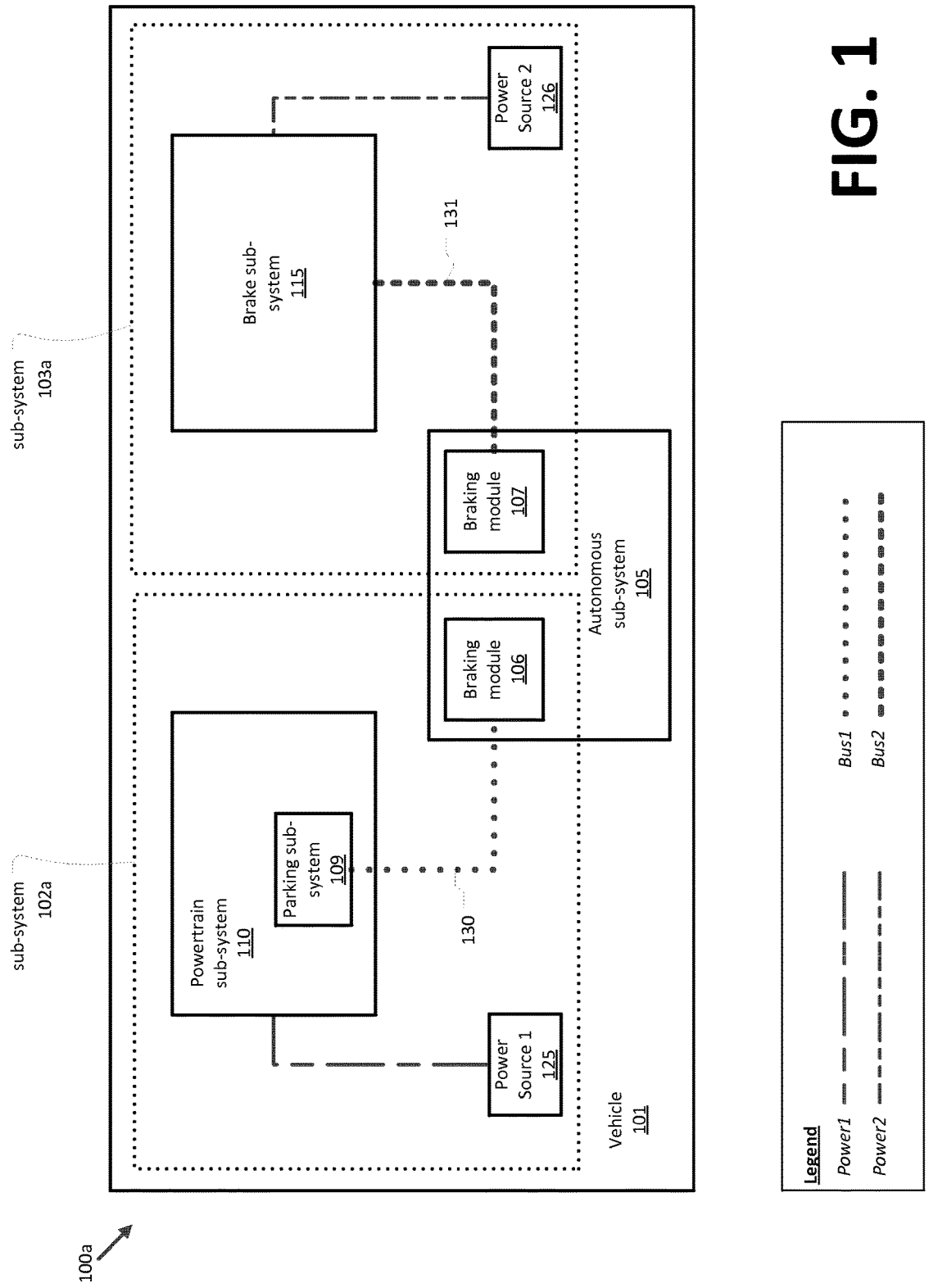
FIG. 1 is a block diagram of an example of a vehicle parking restraint failure management system.

FIG. 1 is a block diagram of an exemplary vehicle parking restraint failure management system 100a. As used herein, the term "parking restraint" refers to a mechanism for restraining or holding a parked vehicle in place, e.g., a brake, engagement of a gear or gears in a vehicle powertrain, etc. A vehicle 101 includes an autonomous sub-system 105 comprising a combination of software and hardware for performing various operations, such as receiving and processing sensor data, receiving and processing data from various vehicle 101 components, and for providing information and instructions to various vehicle 101 components to support various autonomous actions, i.e., vehicle 101 operations performed without intervention or controlled by a human operator. Accordingly, the autonomous sub-system 105 generally includes one or more modules such as braking modules 106, 107 that include a processor and a memory, the memory including one or more forms of computer-readable media, and storing instructions executable by the processor for performing various operations, including as disclosed herein.

The sub-system 105 is connected to first and second power sources 125, 126, as well as first and second communications buses 130, 131, which, by way of example and not limitation, may be configured for communications as controller area network (CAN) buses or the like, and/or may use other communications mechanisms and/or protocols. Via the buses 130, 131, and/or other wired and/or wireless mechanisms, the autonomous sub-system 105, e.g., modules 106 and/or 107 therein, may transmit messages to various devices or sub-systems in a vehicle 101, and/or receive messages from the various devices, e.g., controllers, actuators, sensors, etc.

Via the buses 130, 131, the sub-system 105 is in communication with various vehicle 101 components, including the modules 106 and 107 respectively being on one of the buses 130, 131 with a powertrain sub-system 110 and a brake sub-system 115. Each of the sub-systems 110, 115, like the autonomous sub-system 105, comprise a combination of software and hardware, i.e., a processor, and a memory storing instructions executable by the processor, for performing operations including those described herein as well as other operations. For example, the powertrain sub-system 110 is generally programmed to perform operations for controlling a vehicle 101 powertrain, the brake sub-system 115 may be programmed to perform operations for controlling one or more vehicle 101 brakes, e.g. a parking brake, etc.

The sub-system 105 includes, as mentioned above, the first and second braking modules 106, 107. The braking modules 106, 107, sometimes referred to as failsafe devices, are each a combination of software and hardware capable of operating independently of the sub-system 105 and one another. The modules 106, 107 are each programmed to detect a fault or failure in the sub-system 105, as well as internal faults or failures. Each of the modules 106, 107 is connected to one of the communications buses 130, 131, e.g., as seen in FIG. 1, the module 106 is connected to the first communications bus 130, and the second module 107 is connected to the second communications bus 131.

The powertrain sub-system 110 includes or is communicatively coupled to a parking sub-system 109, the sub-system 109 including a processor and a memory so as to be programmable in a manner described with respect to other sub-systems herein. The parking sub-system 109 is generally programmed for receiving input, e.g., from the module 106 as illustrated in FIG. 1, and/or from one or more other sources as discussed below with respect to other figures, to actuate a parking mechanism. (In the context of the present disclosure, the term "actuate" can encompass a release, i.e., a disclosure that an element can be actuated means that the element can be actuated and deactuated, e.g., released.) For example, a parking restraint mechanism that may be electronically actuated by the sub-system 109 in response to an input, e.g., from the module 106, may include a parking pawl, engagement of a gear or gears in a vehicle 101 powertrain, or other known mechanism for restraining a vehicle powertrain and thereby restraining movement of a vehicle when the vehicle is parked.

Further in the example of FIG. 1, the module 107 is in communication with the brake sub-system 115 via the second communications bus 131. In general, the brake sub-system 115 includes and/or is communicatively coupled to one or more electronic actuators for actuating a vehicle 101 brake. The brake sub-system 115 can receive input, e.g., from the module 107 and/or other sources, e.g., as discussed with respect to other figures below, to actuate a vehicle 101 brake or brakes. For instance, in the presently-discussed example, the brake sub-system 115 may receive an input from the module 107, whereby the brake sub-system 115 actuates brakes on two of four wheels of the vehicle 101.

One feature of the example of FIG. 1 is that the first power source 125 powers a first subsystem 102a including the powertrain sub-system 110, whereas the second power source 126 powers a second subsystem 103a including the brake sub-system 115. Accordingly, any of a failure in the first subsystem 102a that includes the module 106, the first communications bus 130, and/or the power source 125 means that use of a parking restraint mechanism dependent on the parking sub-system 109, i.e., in this example, a mechanism in the vehicle 101 powertrain, cannot be used. Accordingly, when any such failure is detected, the autonomous sub-system 105 selects the second subsystem 103a including the module 107 and the brake sub-system 115, which use the second communications bus 131 and the second power source 126, to invoke a parking restraint mechanism, e.g., brakes on two or more wheels as described above. Conversely, in the event of a failure in any of the module 107, the second communications bus 131, and/or the second power source 126, the autonomous sub-system 105 is programmed to select the module 106 and the powertrain sub-system 110, which use the first communications bus 130 and the first power source 125, to invoke a parking restraint mechanism, e.g., a parking pawl or engagement of gears, etc.

Figure 2:
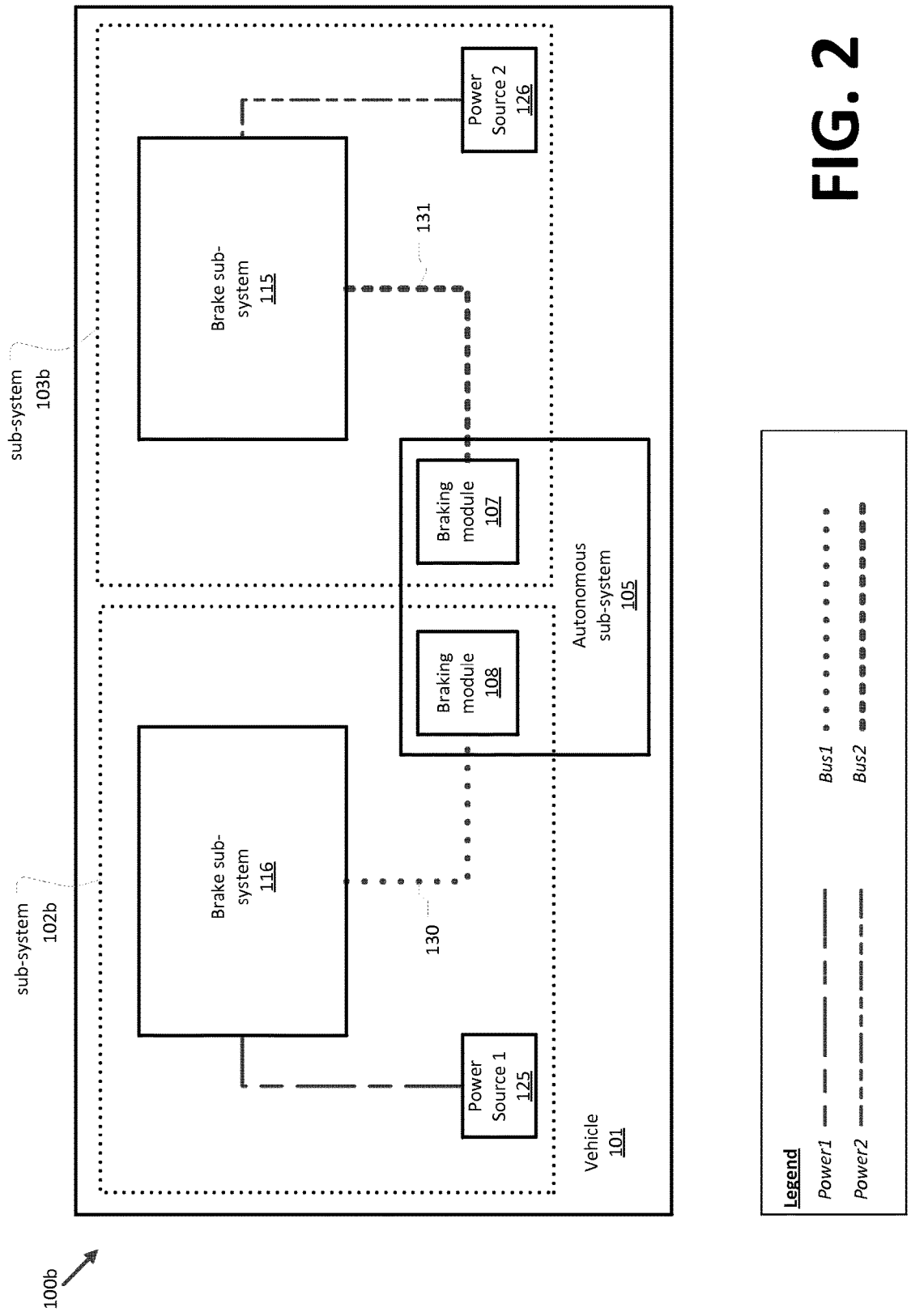
FIG. 2 is a block diagram of another example of a vehicle parking restraint failure management system.

FIG. 2 is a block diagram of another example of a vehicle parking restraint failure management system 100b. In this example, the autonomous sub-system 105 includes a second braking module 108 in addition to the first braking module 107. The modules 107, 108 generally include similar hardware and programming, except that, instead of being communicatively coupled to the brake sub-system 115 via the second communications bus 131 as is the first braking module 107, the second braking module 108 is communicatively connected to the a second braking sub-system 116 via the first communications bus 130. The brake sub-system 115, in this example, is powered by the second power source 126, whereas the brake sub-system 116 is powered by the first power source 125.

Further in the example of FIG. 2, each of the brake sub-systems 115, 116, includes or is communicatively coupled to respective electronic actuators that actuate a brake of at least one vehicle 101 wheel. Accordingly, in the event of a detected failure in a first subsystem 102b including any of the power source 125, the brake sub-system 116, the communications bus 130, and/or the braking module 108, the autonomous sub-system 105 can use elements of a second subsystem 103b including the braking module 107, the second communications bus 131, and the brake sub-system 115, powered by the second power source 126. Conversely, in the event of a failure of the second subsystem 103b, elements of the first subsystem 102b may be used.

Figure 3:
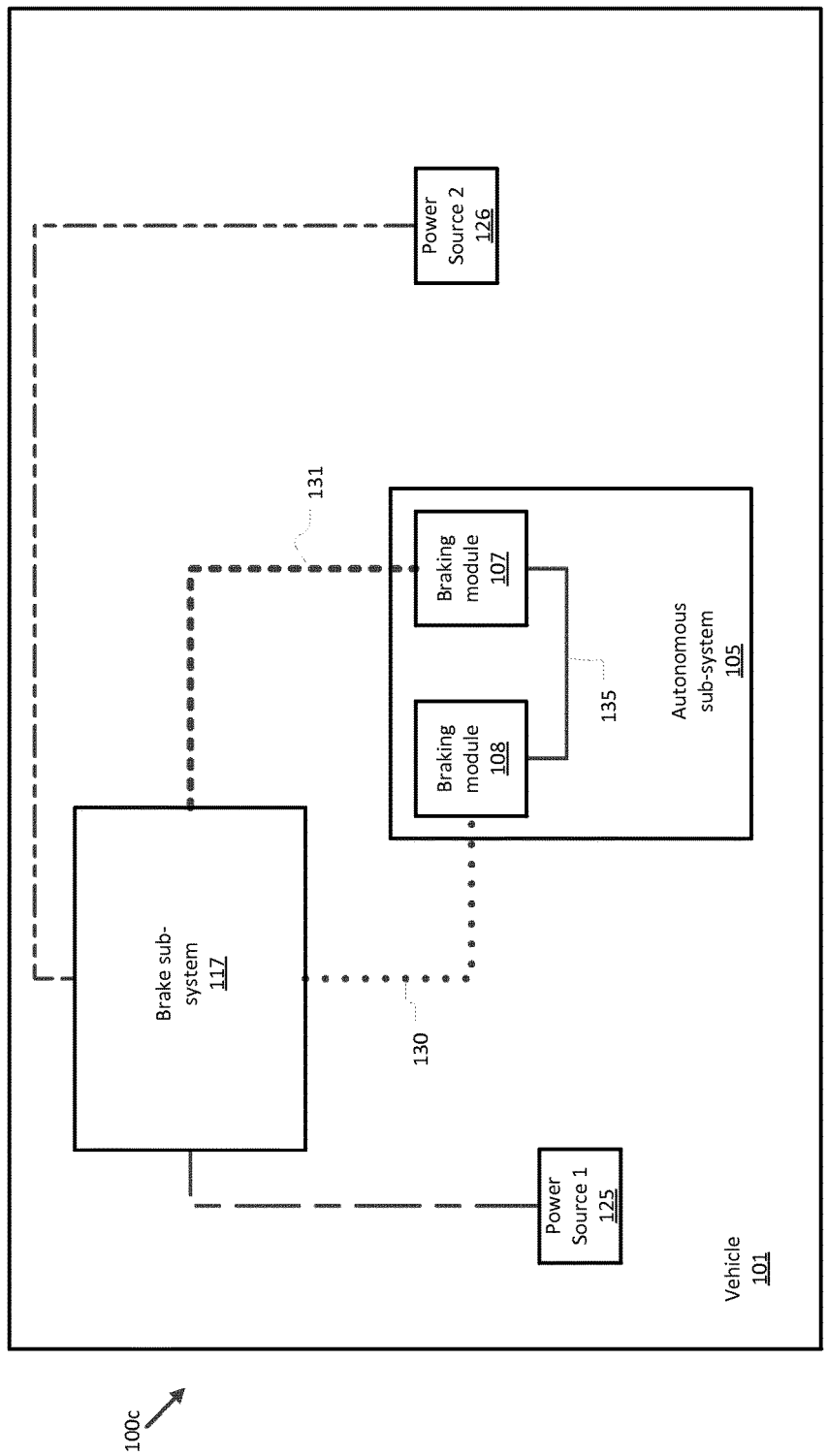
FIG. 3 is a block diagram of yet another example of a vehicle parking restraint failure management system.

FIG. 3 is a block diagram of yet another example of a vehicle parking restraint failure management system 100c. In the example of FIG. 3, the two braking modules 107, 108 are communicatively connected to the brake sub-system 117 via the communications buses 131, 130, respectively. The brake sub-system 117, in a manner similar to described above, in this example includes one or more electronic actuators to actuate a parking restraint mechanism in a vehicle 101 powertrain such as a parking pawl or engagement of a gear or gears.

The modules 107, 108 are further connected by at least one arbitration bus 135. An "arbitration bus" or "arbitration" is defined for purposes of this disclosure as a communications connection or link between two modules in a vehicle 101 sub-system, as well as programming in at least one of the devices, and/or in a microprocessor of the bus 135 itself, for implementing logic to determine an action to take upon detecting a fault or failure. In the example of FIG. 3, the arbitration 135 includes programming for determining which of the two sub-systems 107, 108 to use for providing an instruction to the brake sub-system 117.

The arbitration bus 135 could detect a fault in or associated with one of the modules 107, 108 in a variety of ways. For example, the arbitration 135 may detect a fault in or associated with one of the buses 130, 131 in a variety of ways. For example, in one scenario, the bus 130 may be a primary communications bus, and the bus 131 may be a backup, or secondary communications bus. In this scenario, the module 108 could receive a fault code or the like. For example, a module 108 could then indicate via the arbitration bus 135 to its counterpart device 107 that a fault existed in the bus 130, whereupon the autonomous sub-system 105 could cease use of the primary bus 130, for which the fault was indicated, and switch over to the other bus 131.

Further, the modules 107, 108 may be configured for internal fault detection, e.g., independent microprocessors within a module 107 or 108 could be used to compute and compare results to determine the presence of a fault. Alternatively or additionally, a module 107, 108 could receive a fault condition externally, e.g., via one of the buses 130, 131. In any event, upon detecting or determining a fault, a primary module 108, for example, could communicate via the arbitration bus 135 with a secondary module 107 to indicate the fault, whereupon the secondary module 107 could take over operations previously undertaken by the primary module 108. Further, the secondary module 107 could send a message to the autonomous sub-system 105 indicating the fault condition and/or that communications from the sub-system 110 via the bus 130 should be ignored, and communications from the secondary bus 131 should be used.

In any event, in the example of FIG. 3, each of the modules 107, 108 may be independently provided with a so-called "wake-up" source, e.g., a first module 108 may have a wake-up source as a CAN bus 130 as is known, and a second sub-system 107 may have a wake-up source as a second CAN bus 131, as is known. Further, each of the modules 107, 108 may be programmed to provide a wake-up notification to the other via the arbitration bus 135. In the event of a failure of the bus 130 to provide a wake-up notification to the module 108, the module 107 may provide the wake-up notification via the arbitration bus 135 Likewise, in the event of a failure of the bus 131 to provide a wake-up notification to the module 107, the module 108 may provide the wake-up notification via the arbitration bus 135.

Figure 4:
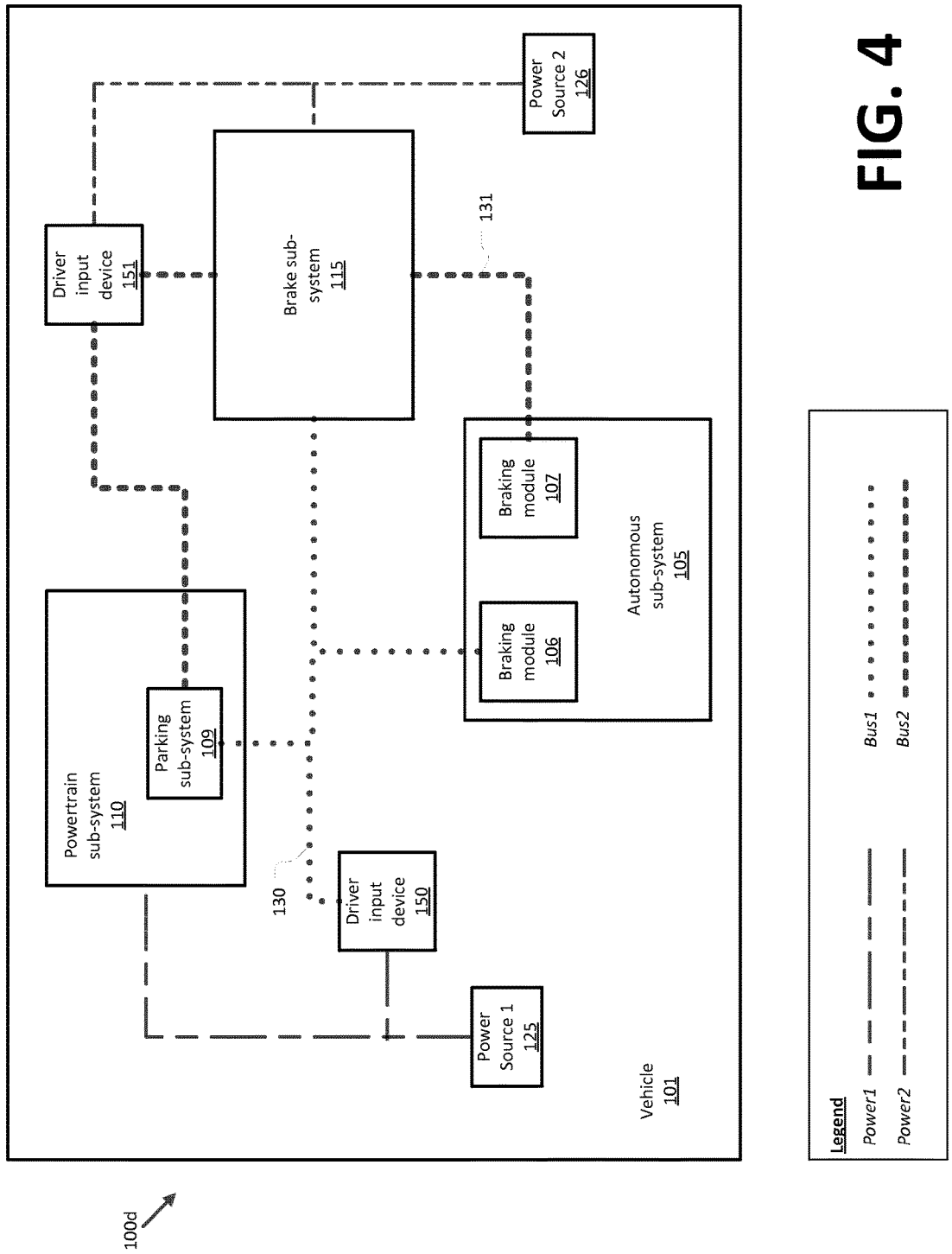
FIG. 4 is a block diagram of yet another example of a vehicle parking restraint failure management system.

FIG. 4 is a block diagram of yet another example of a vehicle parking restraint failure management system 100d. The system 100d of FIG. 4 is similar to the system 100a of FIG. 1 but further includes a first driver input device 150 powered by the first power source 125 and communicatively coupled to the parking mechanism 109 via the first communications bus 130. The system 100d further includes a second driver input device 151 powered by the second power source 126, and communicatively coupled to the parking mechanism 109 via the second communications bus 131. The driver input devices 150, 151 may be various mechanisms, such as a switch, a menu item on a graphical user interface (GUI) or the like provided in the vehicle 101, etc. Each of the driver input devices 150, 151 may be used by a vehicle 101 occupant to indicate that a parking restraint mechanism should be actuated. Accordingly, input could be provided from a device 150, 151 to the parking mechanism 109, which in turn could provide a signal to an actuator or the like to engage a parking restraint mechanism in a vehicle 101 powertrain, e.g., a parking pawl, engagement of one or more gears, etc.

Further, similar to the arrangement of the modules 108, 107 in the system 100c of FIG. 3, the modules 106, 107 could be communicatively coupled to the brake sub-system 115 via the communications buses 130, 131, respectively. Where the powertrain sub-system 110 is powered by the first power source 125, the brake sub-system 115, in this example, is powered by the second power source 126.

In one implementation of the system 100d, the parking sub-system 109 could detect a fault in a first driver input device 150, e.g., a failure of the power source 125, the communications bus 130, or the input device 150. Upon detecting such fault, the parking sub-system 109 could provide a signal to activate the second input device 151, which could then be used to provide input to activate a parking restraint via the parking sub-system 109.

Yet further alternatively or additionally, a fault in one or both input devices 150, 151 could be detected by or communicated to one of the sub-systems 106, 107. Upon detection of such fault, one or both of the sub-systems 106, 107 could provide an instruction to the brake sub-system 115 via a bus 130, 131 to actuate a brake mechanism or mechanisms associated with one or more wheels of the vehicle 101.

Figure 5:
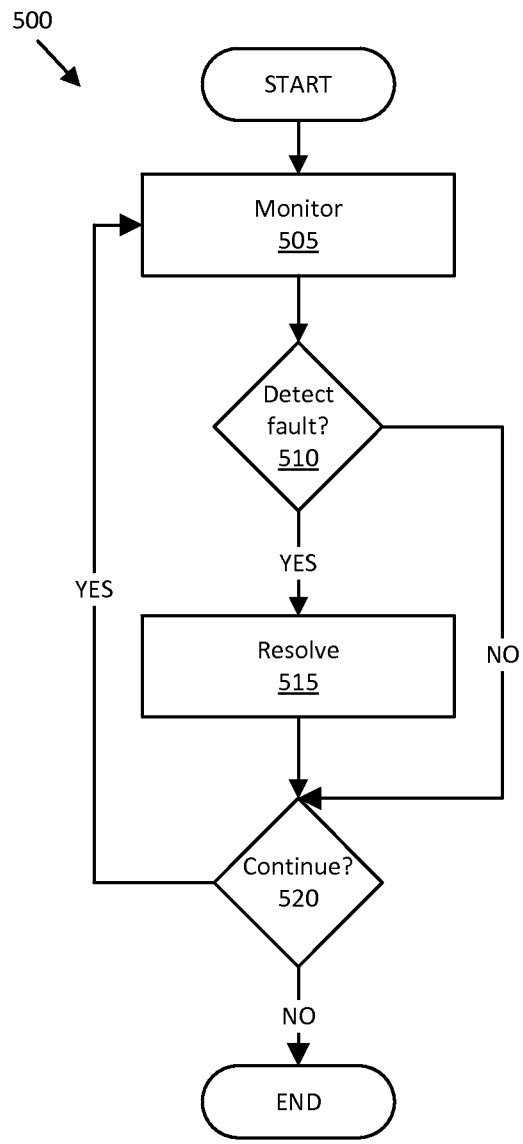
FIG. 5 illustrates an example of a process for responding to a fault condition with respect to one or more components in a vehicle responsible for one or more parking restraint mechanisms.

FIG. 5 illustrates an example of a process 500 for responding to a fault condition with respect to one or more components in a vehicle 101 responsible for one or more parking restraint mechanisms. The process 500 begins in a block 505, in which the autonomous sub-system 105, e.g., via a module 106, 107, 108, etc. as discussed above, and/or a parking sub-system 109 monitors to determine whether a fault is detected.

In a block 510, following the block 505, if a fault is detected, the process 500 proceeds to a block 515. Otherwise, the process 500 proceeds to a block 520.

In the block 515, a detected fault is resolved, e.g., in a manner described above. Further, a possible feature of the various embodiments discussed above is that the autonomous sub-system 105 could determine, in the event of a fault, parking capabilities of the vehicle 101. For example, if vehicle 101 braking can be provided for less than all of the wheels of the vehicle 101, e.g., three, two, or even one wheel of a vehicle 101 having four wheels, then there may be parking scenarios unsuitable for the vehicle 101. For example, a vehicle 101 having only one or even two wheels subject to braking should not be parked on a steep incline. Accordingly, the autonomous module 105 may be programmed to park the vehicle 101 appropriately for available braking, i.e., in a situation where available brakes or stopping mechanisms will restrain the vehicle. For example, where only one wheel can be braked, only substantially flat parking places may be deemed suitable. Likewise, if a vehicle is heavily laden with cargo, only substantially flat parking places may be acceptable, even if more than one wheel can be braked.

Following either of the blocks 510, 515, in a block 520, is determined whether the process 500 should continue. For example, if the process 500 may end when a vehicle 101 is powered off. In any event, if the process 500 is to continue, then control returns to the block 505. Otherwise, the process 500 ends.

The process 500 could be executed in the autonomous sub-system 105, the parking sub-system 109, etc. and/or some combination of such sub-systems and/or modules in the vehicle 101. Further, the sub-systems 105, 110, 115, etc. may include other modules, power connections, and communication connections, in addition to those shown in the figures and discussed herein. For example, the powertrain sub-system 110 in particular may warrant further redundancy and/or provide alternative or additional failover options, such as a "coast-down" mode in the event of a powertrain sub-system 110 failure. Moreover, the autonomous sub-system 105 may include additional modules, power connections, and communication connections in addition to those shown therein.

FIGS. 1-4 illustrate examples of architectures that may be provided for various embodiments. It is to be understood that these architectures may be varied without departing from the scope of the present disclosure. For example, various braking modules 106, 107, 108 are shown as included in the autonomous sub-system 105. However, the autonomous sub-system 105 may not be a physically distinct sub-system in the vehicle 101 and/or the modules 106, 107, 108 could be physically located in or proximate to other elements discussed herein, e.g., a brake sub-system 115.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
an autonomous sub-system that includes first and second braking modules, each of the first and second braking modules comprising a processor and a memory, each of the memories of the first braking module and the second braking module storing instructions executable by the processor of the first braking module or second braking module, respectively, for detecting a fault; and
a brake sub-system programmed to actuate a brake mechanism in response to a signal from the second braking module;
wherein the first braking module is communicatively coupled to the brake sub-system via a first communications bus and the second braking module is communicatively coupled to the brake sub-system via a second communications bus, wherein the first braking module and second braking module are programmed to independently operate the brake sub-system, and wherein the autonomous sub-system is further programmed to select one of the braking modules to provide a signal to the brake mechanism depending on whether a fault is detected.

2. The system of claim 1, wherein each of the first and second braking modules is programmed to receive an indication of the fault from the first communications bus or the second communications bus, respectively, and wherein at least a portion of at least one of the first communications bus and the second communications bus is external to the autonomous sub-system.

3. The system of claim 2, wherein each of the first and second breaking modules is programmed to receive a wakeup notification from one of the first communications bus and the second communications bus.

4. The system of claim 2, wherein each of the first and second braking modules is programmed to send a wakeup notification to the other one of the braking modules in case of a failure of one of the first and second communications busses.

5. The system of claim 1, further comprising first and second power sources, wherein the first braking module is connected to the first power source and is programmed to activate brakes of at least one wheel in a vehicle, and the second braking module is connected to the second power source and is programmed to activate brakes of at least one wheel in the vehicle.

6. The system of claim 5, further comprising a first driver input device powered by the first power source.

7. The system of claim 6, wherein the first driver input device is communicatively coupled to a parking mechanism via the first communication bus.

8. The system of claim 6, further comprising a second driver input device powered by the second power source, wherein the second driver input device is communicatively coupled to a parking mechanism via the second communication bus.

9. The system of claim 8, wherein the first braking module is programmed to detect a fault in at least one of the first driver input device and the second driver input device and actuate the brake system as a result of detecting the fault in at least one of the first driver input device and the second driver input device.

10. The system of claim 8, wherein the second braking module is programmed to detect a fault in at least one of the first driver input device and the second driver input device and actuate the brake system as a result of detecting the fault in at least one of the first driver input device and the second driver input device.

11. The system of claim 8, further comprising a parking sub-system programmed to detect a fault with the first driver input device and activate the second driver input device to activate a parking restraint via the parking sub-system as a result of detecting the fault with the first driver input device.

12. The system of claim 6, further comprising a powertrain sub-system powered by the first power source and wherein the brake sub-system is powered by the second power source.

13. The system of claim 1, further comprising a parking sub-system programmed to actuate a parking restraint mechanism in a vehicle powertrain in response to a signal from the first braking module.

14. The system of claim 13, further comprising a first power source that powers the parking sub-system and the vehicle powertrain, and a second power source that powers the brake sub-system.

\* \* \* \* \*